J. P. SMITH.
ROLLING DRUM PLOW.
APPLICATION FILED JUNE 25, 1906.

922,535.

Patented May 25, 1909.
7 SHEETS—SHEET 1.

FIG. I.

WITNESSES
Jas. M. Tapley
G. S. Roxburgh

INVENTOR
J. P. Smith
By Fred O. Falenstenhaugh
His Atty

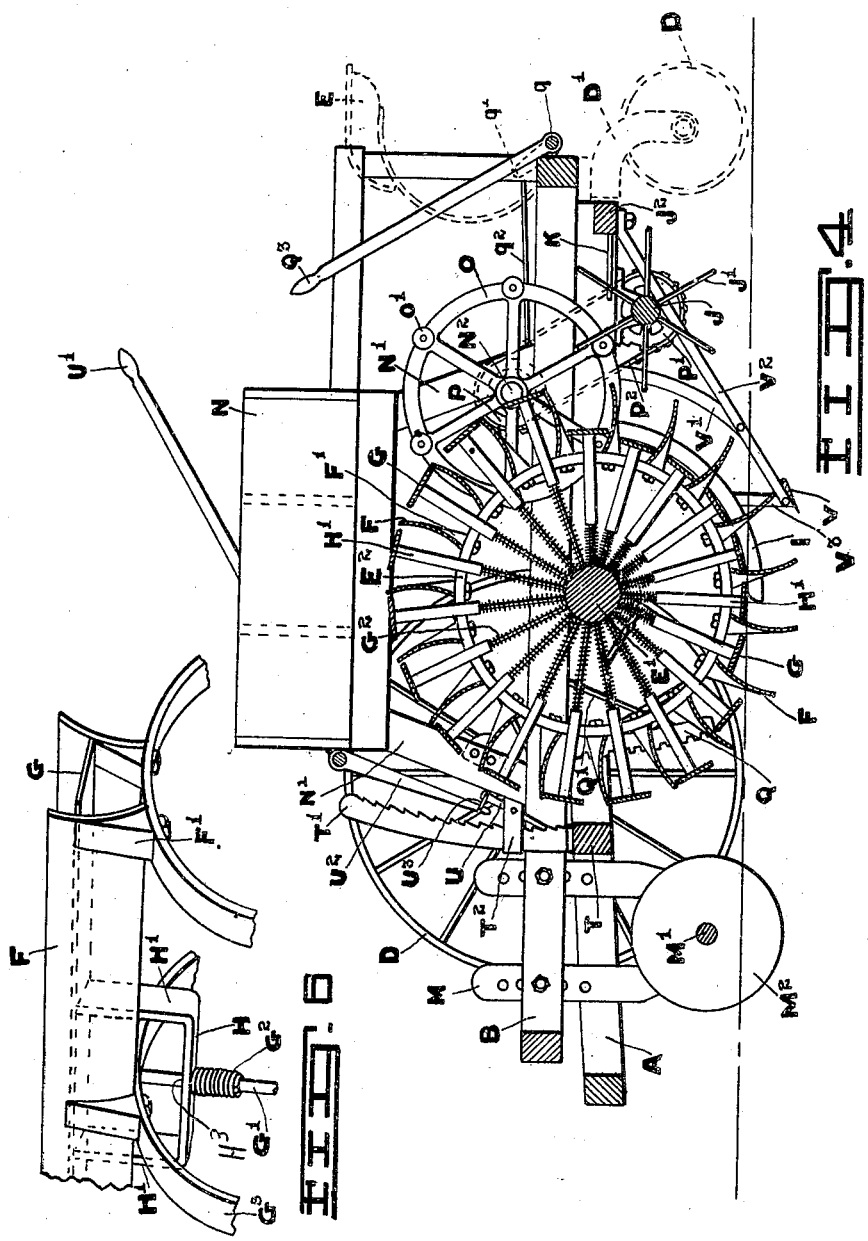

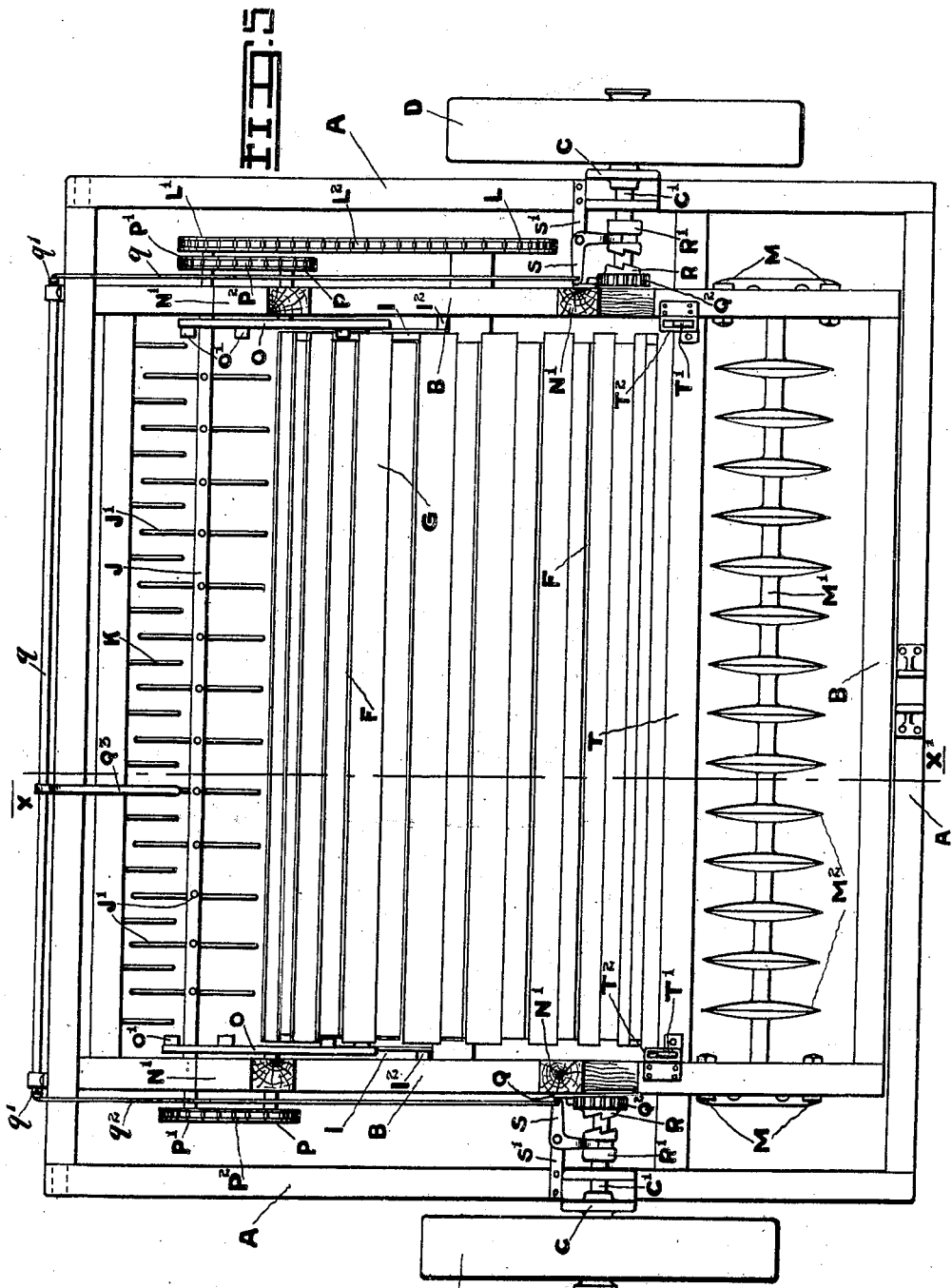

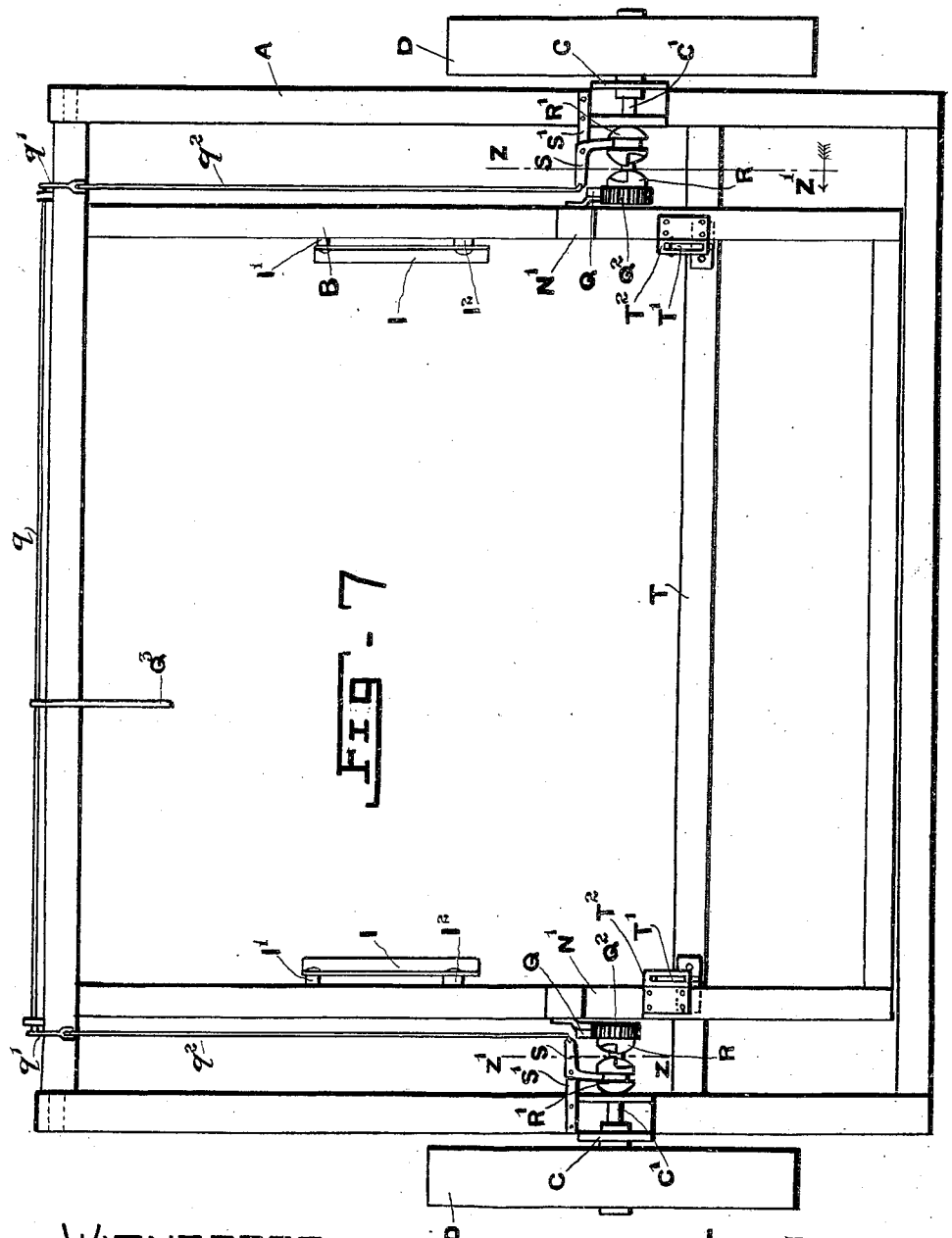

J. P. SMITH.
ROLLING DRUM PLOW.
APPLICATION FILED JUNE 25, 1906.
922,535.
Patented May 25, 1909.
7 SHEETS—SHEET 7.
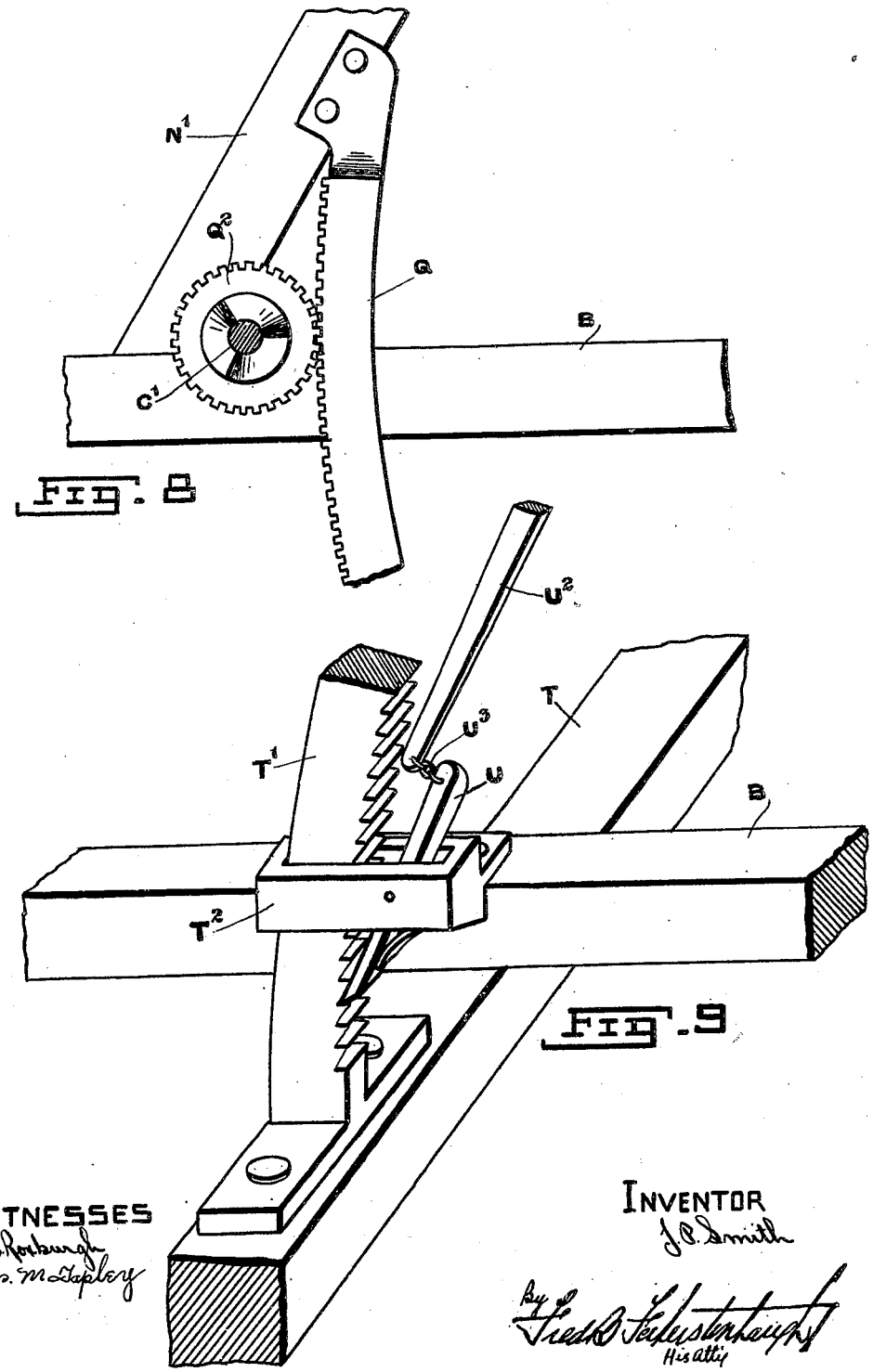
WITNESSES
INVENTOR

UNITED STATES PATENT OFFICE.

JEHIEL P. SMITH, OF FROBISHER, SASKATCHEWAN, CANADA, ASSIGNOR OF ONE-FOURTH TO JAMES LOFTUS LARMER AND ONE-FOURTH TO JOHN SMITH McCUTCHEON, OF FROBISHER, CANADA.

ROLLING-DRUM PLOW.

No. 922,535.     Specification of Letters Patent.     Patented May 25, 1909.

Application filed June 25, 1906. Serial No. 323,309.

*To all whom it may concern:*

Be it known that I, JEHIEL P. SMITH, of the village of Frobisher, in the Province of Saskatchewan, Canada, farmer, have invented certain new and useful Improvements in Rolling-Drum Plows, of which the following is the specification.

The invention relates to improvements in plows.

The object of the invention is to provide a strong compact and highly efficient plow which instead of furrowing, as has heretofore been done, will cut the earth into block strips to any required depth and lifting and throw such strips inverted on the ground to the rear of the plow and it consists essentially of a rectangular carriage frame, an inner adjustable frame dependent therefrom, carriage wheels secured on the carriage frame, a shaft centrally disposed within the adjustable frame and extending transversely thereacross, annular rings supported upon the shaft, shears or cutting blades secured to and extending from the periphery of the rings, adjustable colters secured in bearings dependent from the adjustable frame, means for clearing the face of the shears after a cut, means for receiving and throwing downwardly the cut inverted and means for raising or lowering the adjustable frame, all arranged and constructed as hereinafter more especially described.

Figure 1:
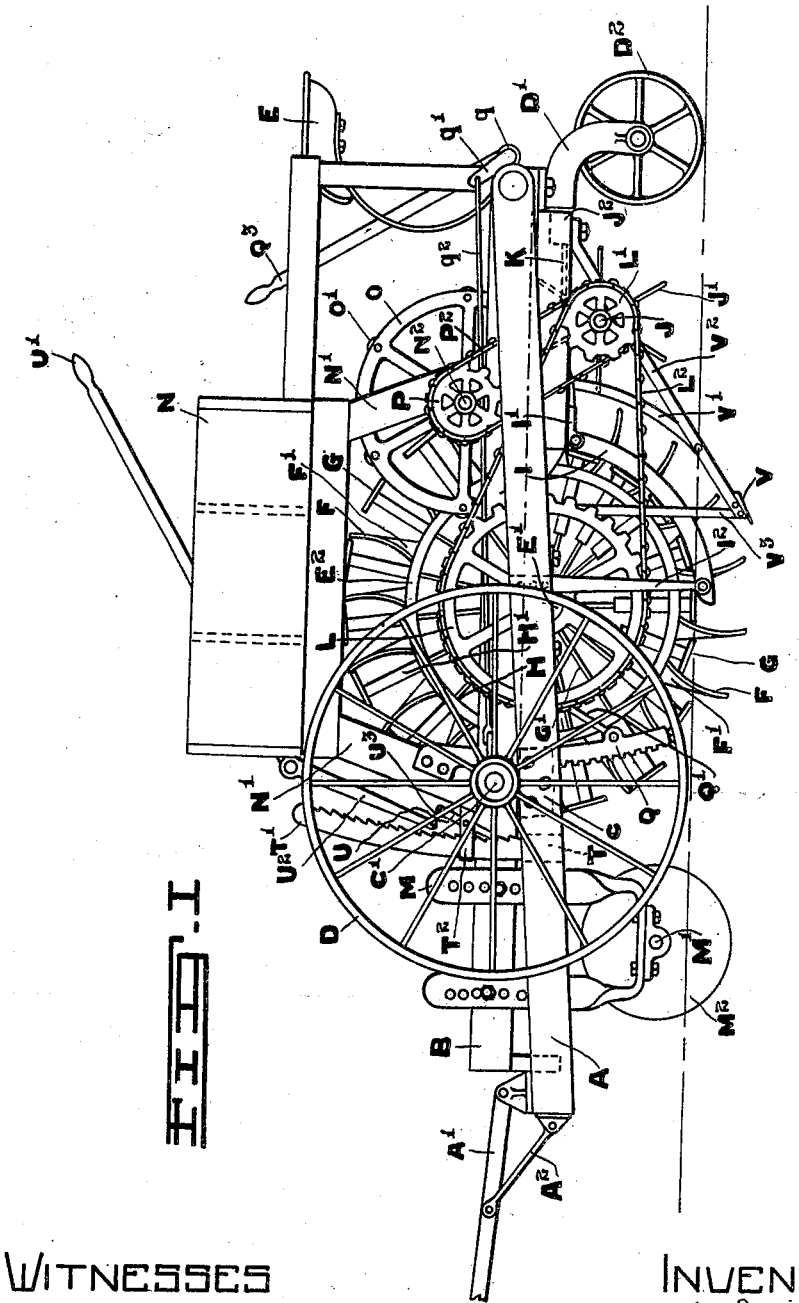
Figure 2:
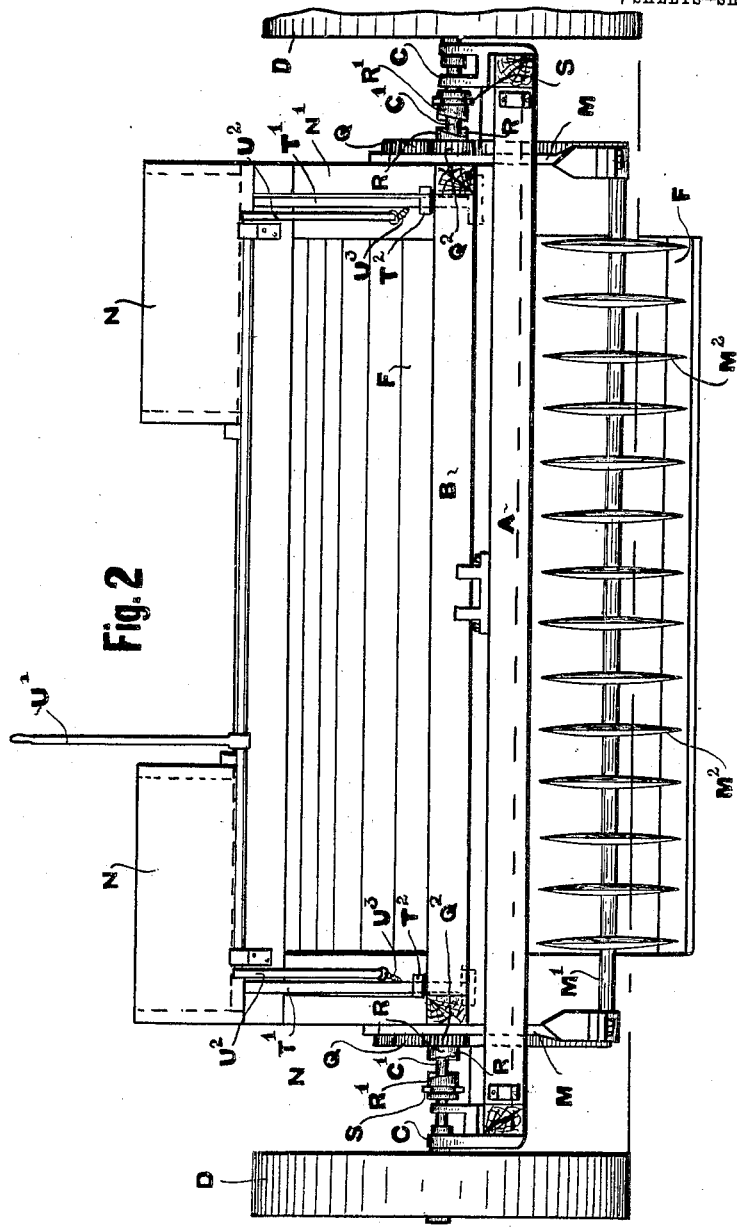
Figure 3:
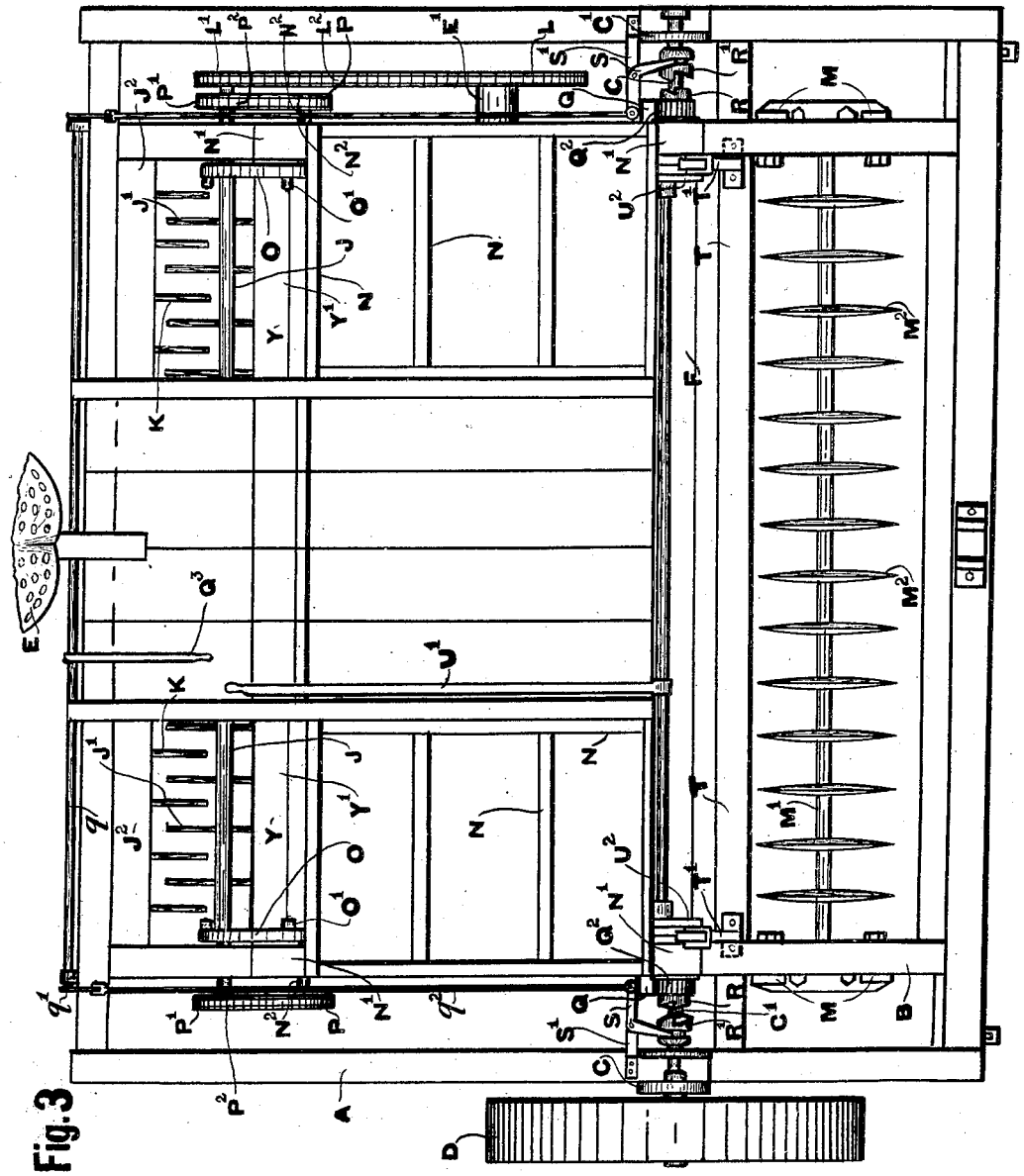

Figure 1, is a side elevation of my complete invention. Fig. 2 is a front elevation as in Fig. 1. Fig. 3 is a plan view of the plow. Fig. 4 is a longitudinal, vertical section of the machine, the section being taken along the line X X¹ in Fig. 5. Fig. 5 is a plan view, with the stone boxes and platform removed. Fig. 6 is an enlarged, detailed, perspective view of a portion of the shares, and shows the means employed for supporting the plungers. Fig. 7 is a plan view showing the two frames of the machine, with the wheels and the drum omitted. Fig. 8 is a detailed side elevation showing a portion of the frame B, the rack, and the pinion engaging with the rack, such being an enlarged view taken in the plane denoted by the line Z Z' Fig. 7 and looking in the direction of the arrow. Fig. 9 is an enlarged detailed perspective view of a portion of the frame B and the cross bar T showing one of the racks T', the guideway T², and the spring pawl engaging the rack.

In the drawings like letters of reference indicate corresponding parts in each figure.

A is the carriage frame which is rectangular in form and to which, upon the forward cross piece is secured the ordinary tongue A' by braces A² for the draft animals. Toward the forward end of the frame A are bearings C extending upwardly which receive the axles C' of the main carriage wheels D. To the rear cross beam of the carriage frame is secured centrally a swivel wheel fork D¹ in which bears a swivel wheel D² forming the rear support for the plow frame.

B is a rectangular frame of a length and breadth slightly less than the carriage frame A, such dimensions being so that it may pass within the larger frame when necessary. Rearwardly the said frame B is pivotally supported from the carriage frame A. This connection may be made by making the rear cross bar of the inner frame serve also as the connection between the rear ends of the side bar of the outer frame and rotatably mounting it in said rear ends as indicated at B' in Fig. 1. A seat E is attached to the carriage frame at the back and in a suitable position.

Disposed within suitable bearings dependent from the frame B and running transversely thereacross, is a shaft E¹ which extends outwardly from the frame for a purpose hereinafter explained.

Encircling the shaft E¹ and concentric therewith are a series of similar annular rings E² which are rigidly secured to the shaft and designed to rotate therewith. The number of the rings is immaterial, there being enough to withstand the subjected strain and they form simply an inner shell or drum to which are secured shears or cutting knives F running transversely across the frame and parallel the one with the other. The shears have the outer edge sharpened and their blades concaved and are made preferably of hardened steel in order that they may keep their edge. To the rear face of the said knives are secured brackets F¹ which are held by counter-sunk rivets to the blade and bolted to the several rings E².

Extending longitudinally between the successive shears and slidable therebetween are plungers G which are bars extending longitudinally of the drum, and the bars when in active operation are designed to have one of their edges bearing against the forward face of the shear; it being also necessary that these plungers extend slightly beyond the ends of the shears to engage as explained hereafter; the means employed for so doing being hereinafter described. Extending radially from the shaft $E^1$ are rods $G^1$ there being two rods for each plunger. These sets of rods abut at their outer extremity two annular rings $G^3$ extending within the shears and secured to their inner face. Extending longitudinally within the rings $G^3$ and directly behind each plunger is a strip H, which is secured to the plunger by means of arms $H^1$ passing radially between the shears. The strips have each openings $H^3$ through which the set of rods to each plunger extends. Enveloping the rods are spiral springs $G^2$ which abut at their inner extremity the axle and at their outer the inner face of the longitudinal strips H; thus it will be seen that the plungers have an outward radial motion being normally held in an outer position between the shears and actuated by the springs. This design is so that the plungers may through the actuation of the springs, to some extent, clear the face of the shears after a cut, further precaution being made as hereinafter explained to avoid the use of an unnecessarily strong spring and to give a decided action of the plungers to their extreme outer positions. The concave form of the shears is that they may the more easily be forced into the ground upon their rotation.

I are arcuate plunger guides of an angle bar form having their center concentric to the axle $E^1$ and arranged one on either side of the frame B having one arm of the angle bars extending inwardly and the other vertically. Hinges $I^1$ are bolted to a support dependent from the frame B and are secured at their loose arm to the upper extremities of the plunger guides I. The lower extremities of the guides are held by adjustable braces $I^2$ dependent from the frame.

Disposed rearwardly from the rotating drum and dependent from the frame B and passing transversely thereacross is a shaft J, to which are secured series of radially extending scufflers $J^1$. These scufflers extend a length so that when in a horizontal position the ends of one set just clear the tip of the adjoining shear when in its nearest position. Extending horizontally from the cross bar $J^2$ are similar pins K which are arranged alternately in position between the scufflers and form collectively a rake to the rear of the scufflers.

Rigidly secured to the heretofore mentioned extending portion of the shaft $E^1$ and laterally displaced from the drum is a sprocket wheel L. Secured to the shaft J is a second, smaller sprocket wheel $L^1$ which is connected to the larger wheel L by means of a chain $L^2$, the smaller wheel being rotated upon rotation of the larger. The number of teeth on the two wheels is such that a set of scufflers $J^1$ is brought so that it coöperates with each shear after its plunger has been released from the guide way I.

Disposed forwardly upon the frame B are adjustable frames M extending downwardly one on either side, and in each a shaft $M^1$ bears to which are secured colters $M^2$ suitably spaced, such colters being designed to cut the earth into longitudinal strips. By the combined action of the colters and the shears upon the drum, the earth is cut longitudinally and transversely, into blocks upon the forward movement of the machine. It is to be noted that in the rotation of the drum the shears are forced into the ground and the plunger shoved inwardly due to the pressure of the ground upon their front face. Various positions of the plungers are shown clearly in Figs. 1 and 4. When the rotation is farther advanced the plungers, due to the springs tend to release but are caught at either end by the plunger guide I; the extension of the plungers beyond the shears, as heretofore mentioned, being for the purpose of catching within the guide way formed by the angle bars.

N are boxes secured to the frame by uprights $N^1$ and preferably above and near the drum and placed on either side of the center leaving an opening therebetween. The boxes are so that they may receive material, such as stones or the like when it is required to have additional weight to that of the machine for forcing the knives into the ground.

$N^2$ is a shaft extending transversely across the frame B and bearing thereon. Rigidly secured to the shaft are two wheels O each having a series of rollers O' pivoted circumferentially upon the inner face. The diameter of these wheels and the number and the position of the rollers (the rollers being equiradially disposed) is such that when the wheels O are rotated the rollers O' engage successively with the successive plungers. That is immediately the plunger is released from the guide way in its rotation a roller bears upon its inner face and in the continued rotation of the wheel O rolls over the entire rear face of the plunger and draws it outward to its limiting position. This as heretofore stated avoids the necessity of having unnecessarily strong springs to actuate the plungers.

A gear wheel P is secured at the outer extremities of the shaft $N^2$ and is connected to a second gear wheel $P^1$ upon the shaft J by means of a chain $P^2$.

The complete action of the plow upon the earth is as follows. The blocks having been cut tend to remain between the shears and are forced outwardly by the plungers. A portion of it will clear from the shears but the bulk will remain therein and not be forced completely from the face of the shears till the rollers O¹ actuate the plunger outwardly after its being released from the guide way. The earth is thrown rearwardly and is caught by the scufflers from which it is deposited on the ground. The teeth K tend to rake or clear out any earth which clings to the scufflers.

The means which I employ for varying the depth of the cut is by lifting the frame B by a rack and pinion, the lift being made by the draft. Upon either side and secured to the front supports N¹ are lifting racks Q braced at their lower extremity by braces Q' extending from the frame. Upon the shafts C' are journaled pinions Q² in mesh with the lifting racks. Secured to the pinions are clutches R designed to engage with second clutches R' when they are thrown into operative position. The clutches R' are slidable upon the shafts being constrained by feathers.

Q³ is a lifting lever connected by a rod q, links q' and connecting rods q² to bell crank lever S which are designed to throw the respective clutches R' into active engagement with the clutches R. It will thus be seen that upon throwing the lever Q³ the motions of the carriage wheels D are transmitted to the pinions Q² and they engaging the racks lift the entire frame B. The bell cranks S are supported at their angles by brackets S' secured to and extending from the frame A.

Rigidly secured upon the cross bar T of frame A are two pawl racks T' extending upwardly one on either side, their position being such that they pass through guide ways T² extending inwardly from and secured to the frame B. Spring pawls U pivotally supported from the guide ways T² bear normally upon the teeth of the racks.

U' is a releasing lever to which is secured an arm U² which by a chain U³ or other such convenient means is attached to the free end of the pawls. When it is desired to raise the drum, i. e., to decrease the depth of the cut, the lever Q³ is thrown and as before stated engages the pinion with the rack Q. Coincident with this upward motion the pawls U are spring pressed against the rack T¹ and upon the cessation of the motion engage teeth which prevent the frame B from dropping. According to the length of time which the lever Q³ is held in operative position so the height to which the frame rises. When it is required to drop the frame B the lever U¹ is pulled downwardly releasing the pawl from the rack.

It is to be noted that the colters are adjusted with the adjustment of the shears they being dependent from the frame B.

V is a root cutter and V' a sand board suitably supported from the frame B by means of braces V² V³.

It is to be understood, that the drum and in fact all the moving parts of the plow may be further incased or housed than has herein been mentioned in order to avoid any chance of accident due to being caught within the parts and I also wish it to be understood that various changes in the relative position of the rotating parts may be made without in the least departing from the spirit of my invention.

What I claim as my invention is:

1. In a device of the class described, the combination with the wheeled frame, of a vertically adjustable frame carried thereby, a centrally disposed rotatable drum, curved cutting blades radially disposed with relation to the drum and located in longitudinal rows, bars extending lengthwise of the drum between the rows of blades, spring pressed plungers supporting said bars, said bars having projecting ends, and rotatable wheels having rollers designed to pass upon the said bars and draw them outwardly, substantially as described.

2. In a device of the class described, the combination with a wheeled frame, of a rotatable drum having longitudinally disposed cutting blades on the surface and radially moving expelling bars between said cutters, of wheels located in proximity to the ends of the said drum on the rear side thereof, said wheels having rollers projecting into the paths of the bars, and means for rotating said wheels to cause the rollers to move the bars outwardly away from the center of the drum as the latter rotates, substantially as described.

3. In a device of the class described the combination with a rectangular wheeled frame, of a dependent rectangular adjustable frame, a shaft centrally disposed across the dependent frame, wheels secured to the shaft, shears bolted to the wheels passing transversely thereacross and extending radially therefrom, circular strips secured to the base of the shears, sets of rods extending radially from the shaft and bearing at their outer extremity upon the strips midway between the successive shears, plungers slidable between the shears extending at either end beyond the shears, strips secured to the plungers and guided by the rods, said strips being limited in their outer positions by the circular strips, spiral springs enveloping the rods and abutting upon their inner extremity the shaft and at their outer the inner face of the strips, guide ways dependent from the adjustable frame, coöperative with the extending ends of the plungers, for withholding the plungers in a restrained position and means for forcing the plungers to their extreme outward position upon their being released from the guide ways as and for the purpose specified.

4. In a device of the class described the combination with the adjustable frame, the rotary cutting drum having shears and slidable plungers between the shears of the cutting drum, of guide ways concentric with the drum shaft and dependent from the framework, said guide ways being designed to receive the extending ends of the plungers and restrain them therein for a predetermined length of time as and for the purpose specified.

5. In a device of the class described the combination with the adjustable frame a rotary drum having shears and the slidable plungers between the shears, said plungers having extending ends, of guide ways having an angle bar cross section dependent from the frame and disposed at either side thereof, to the rear of the drum, said guide ways being concentric to the drum shaft and designed to constrain the extending ends of the plungers for a predetermined length of time as and for the purpose specified.

6. In a device of the class described the combination with the adjustable frame, the rotatable cutting drum, the plungers and the plunger guide ways, of revoluble shafts supported from the frame work to the rear of the drum, wheels rigid to the inner ends of the shafts, rollers pivoted circumferentially upon the inner face of the said wheels, the successive rollers being designed in the rotation of the wheels to engage with the rear face of the extending ends of the successive plungers and force them to their extreme outer position when the plungers are released from the guide ways as and for the purpose specified.

7. In a device of the class described the combination with the adjustable frame, the rotatable cutting drum dependent within the frame, the schufflers, the plunger actuating wheels disposed behind the drum and upon the frame and the plunger guide ways of means whereby simultaneously with the rotation of the drum, the scufflers and the plunger actuating wheels are revolved as and for the purpose specified.

8. In a device of the class described the combination with the adjustable frame of a rotatable cutting drum, a gear wheel secured to the shaft supporting the drum and at the side thereof, a shaft bearing in the frame and behind the drum having scufflers radially extending therefrom, a set of gear wheels at one extremity of the said shaft a gear wheel at the other extremity, a chain connecting the gear on the drum with one of the opposing gears of the set on the shaft, shafts having bearings in the frame at either side at the rear of the drum and supporting plunger actuating wheels, gear wheels secured to the extremities of the actuating wheel shaft and chains connecting the gears of the actuating wheels with the adjoining gears of the scuffler shaft as and for the purpose specified.

JEHIEL P. SMITH.

Witnesses:
J. S. RIDDELL,
H. C. MacCOLL.